(12) United States Patent
Steindorff et al.

(10) Patent No.: US 9,580,083 B2
(45) Date of Patent: Feb. 28, 2017

(54) ON BOARD FUEL STORAGE AND SUPPLY IN A RAIL VEHICLE

(71) Applicant: Alstom Transport SA, Levallois-Perret (FR)

(72) Inventors: Konrad Steindorff, Braunschweig (DE); Klaus Scheller, Braunschweig (DE)

(73) Assignee: ALSTOM TRANSPORT TECHNOLOGIES, Levallois-Perret (FR)

( * ) Notice: Subject to any disclaimer, the term of this patent is extended or adjusted under 35 U.S.C. 154(b) by 30 days.

(21) Appl. No.: 14/212,406

(22) Filed: Mar. 14, 2014

(65) Prior Publication Data
US 2014/0290526 A1  Oct. 2, 2014

(30) Foreign Application Priority Data
Mar. 29, 2013 (EP) ..................... 13305420

(51) Int. Cl.
| | | |
|---|---|---|
| *B61C 5/02* | (2006.01) | |
| *B61C 17/02* | (2006.01) | |
| *B61C 5/00* | (2006.01) | |
| *F02M 37/00* | (2006.01) | |
| *F02M 37/18* | (2006.01) | |
| *B60K 15/03* | (2006.01) | |

(52) U.S. Cl.
CPC .............. *B61C 17/02* (2013.01); *B60K 15/03* (2013.01); *B61C 5/00* (2013.01); *F02M 37/007* (2013.01); *F02M 37/0088* (2013.01); *F02M 37/18* (2013.01); *B60K 2015/03118* (2013.01); *B60Y 2200/30* (2013.01)

(58) Field of Classification Search
CPC .............. B61C 5/00; B61C 5/02; B61C 17/00; B61C 17/02; B61C 17/06
USPC ................. 105/26.05, 27, 35, 62.1, 231, 236
See application file for complete search history.

(56) References Cited

U.S. PATENT DOCUMENTS

| | | | | |
|---|---|---|---|---|
| 542,846 | A * | 7/1895 | Diesel ....................... | F02B 3/06 |
| | | | | 123/1 R |
| 1,691,249 | A * | 11/1928 | Palmer ...................... | B61C 9/24 |
| | | | | 105/35 |
| 1,714,219 | A * | 5/1929 | Geiger ....................... | B61C 9/22 |
| | | | | 105/64.1 |
| 1,839,921 | A * | 1/1932 | Herr ......................... | B60L 15/38 |
| | | | | 105/61 |
| 3,884,255 | A | 5/1975 | Merkle | |
| 5,566,712 | A | 10/1996 | White et al. | |

(Continued)

FOREIGN PATENT DOCUMENTS

| | | |
|---|---|---|
| EP | 228176 | 7/1987 |
| EP | 1847413 | 10/2007 |

*Primary Examiner* — R. J. McCarry, Jr.
(74) *Attorney, Agent, or Firm* — Davidson, Davidson & Kappel, LLC

(57) ABSTRACT

A rail vehicle (10) with fuel consumers (20, 22, 30, 32, 34) and an on board fuel storage and supply system, characterized by a main fuel tank (24) adapted to be installed in a first railcar (12) of the rail vehicle (10), a buffer fuel tank (36) adapted to be installed in a second railcar (14) of the rail vehicle (10), and a fuelling device (38) for transferring fuel from the main fuel tank (24) to the buffer fuel tank (36). Preferred application to internal combustion engine rail vehicles with multiple railcars equipped with multiple diesel engines.

17 Claims, 6 Drawing Sheets

(56) References Cited

U.S. PATENT DOCUMENTS

2014/0033948 A1\* 2/2014 Foege .................. B61C 5/00
  105/236
2014/0034151 A1\* 2/2014 Foege .................. B61C 17/02
  137/345

\* cited by examiner

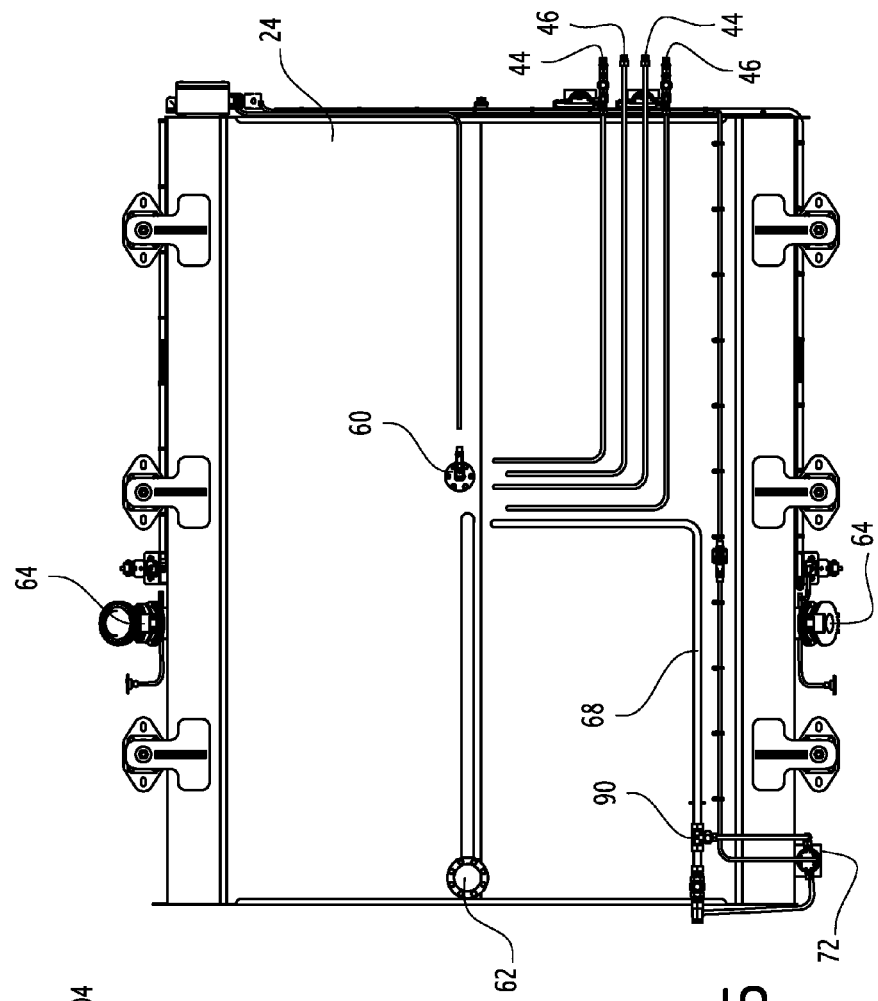
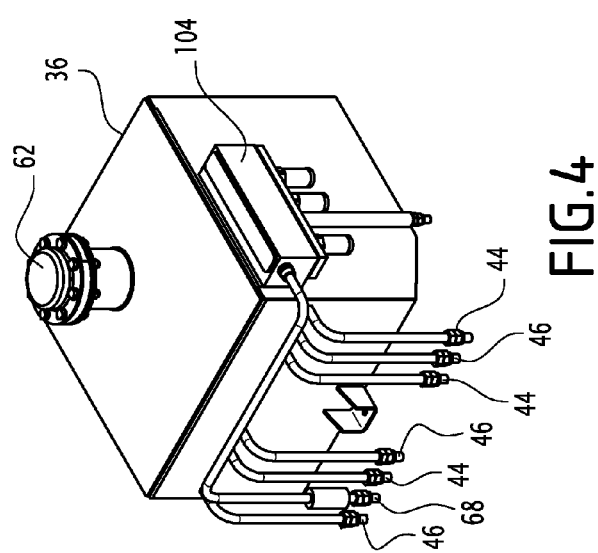
FIG.4
FIG.5

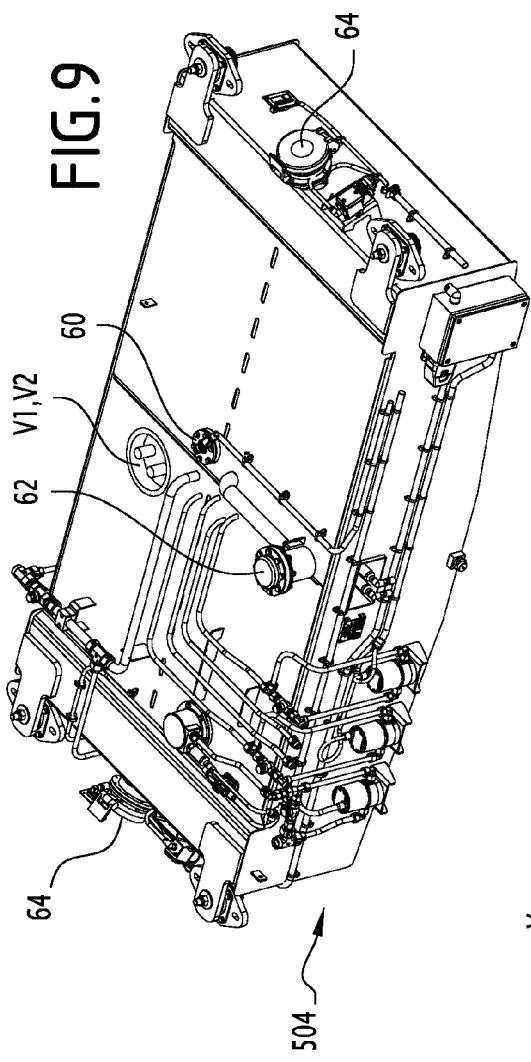
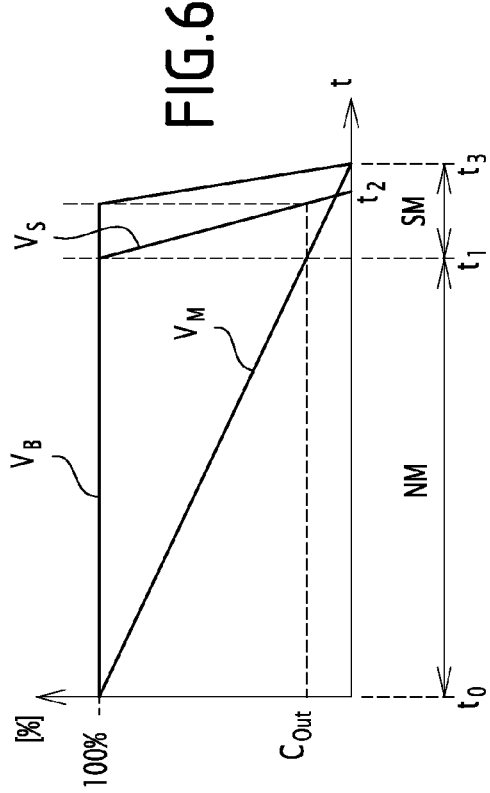

ON BOARD FUEL STORAGE AND SUPPLY IN A RAIL VEHICLE

This claims the benefit of European Patent Application EP 13305420.5, filed Mar. 29, 2013 and hereby incorporated by reference herein.

The present invention relates to a rail vehicle with fuel consumers and an on board fuel storage and supply system and to a method for storing and supplying fuel in a rail vehicle.

BACKGROUND

A rail vehicle with on board fuel storage and supply is known from EP 1 847 413 B1. Here, a diesel engine and heater are supplied with fuel via supply lines from an onboard fuel tank.

The drawback of this known solution, in particular when it is used in motor train sets with multiple railcars, is its inefficient use of available installation space. Said solution takes up most of the installation space, which is no longer available for other components of the rail vehicle, such as additional driving units.

Document U.S. Pat. No. 5,566,712 provides a further example of a known rail vehicle with on board fuel storage and supply system.

SUMMARY OF THE INVENTION

It is an object of the present invention to provide a rail vehicle with an on board fuel storage and supply system and corresponding method that allow for better use of installation space available on the rail vehicle.

The present invention provides a rail vehicle including a first railcar, a second railcar, fuel consumers and an on board fuel storage and supply system characterised in that:
the first railcar has first fuel consumers and a main fuel tank providing fuel to said first fuel consumers;
the second railcar has second fuel consumers and a buffer fuel tank providing fuel to said second fuel consumers; and
the on board fuel storage and supply system has a fuelling device for transferring fuel from the main fuel tank to the buffer fuel tank.

The object is also achieved by a method for storing and supplying fuel in a rail vehicle, characterised in that the rail vehicle includes a first railcar with first fuel consumers and a main fuel tank providing fuel to said first fuel consumers, and a second railcar with second fuel consumers and a buffer fuel tank providing fuel to said second fuel consumers, the method comprising the steps of fuelling the main fuel tank to a desired main level, operating the rail vehicle, during operation of the rail vehicle, fuelling the buffer fuel tank to a desired buffer level and maintaining the buffer fuel tank's fuel level at the desired buffer level by transferring fuel from the main fuel tank to the buffer fuel tank.

By concentrating the fuel storage in a main fuel tank in the first railcar, the size of the fuel tank of the second railcar can be considerably reduced to a small buffer fuel tank. Hence, more installation space is available at the second railcar, which can be used e.g. for additional driving units.

According to preferred embodiments, the inventive rail vehicle may include one, several or all of the following features, in all technically feasible combinations:
the fuelling device comprises a fuel line network for conveying fuel from the main fuel tank to the buffer fuel tank, and a main fuel supply pump located in the fuel line network for installation in the second railcar and for sucking fuel from the main fuel tank to the buffer fuel tank;
the fuelling device further comprises an auxiliary fuel supply pump located in the fuel line network for installation in the first railcar and for pushing fuel from the main fuel tank to the buffer fuel tank;
the fuel line network further comprises a fuel supply pump bypass, preferably with a check valve, for the or each fuel supply pump;
the fuelling device further comprises a controller for controlling the main fuel supply pump and the auxiliary fuel supply pump, wherein the controller is adapted to switch the fuelling device between a normal fuelling mode, wherein the main fuel supply pump supplies fuel to the buffer fuel tank while bypassing the idle auxiliary fuel supply pump via the corresponding bypass, and a fail-safe fuelling mode, wherein the auxiliary fuel supply pump supplies fuel to the buffer fuel tank while bypassing the idle main fuel supply pump via the corresponding bypass;
the fuelling device further comprises a fuel flow sensor in the fuel line network upstream of the buffer fuel tank for detecting fuel flow to the buffer fuel tank, said fuel flow sensor being connected to the controller, wherein the controller is adapted to switch the fuelling device from the normal fuelling mode to the fail-safe fuelling mode if the fuel flow sensor fails to detect fuel flow to the buffer fuel tank;
the fuel flow sensor comprise a fuel chamber with a fuel inlet and a fuel outlet, the inlet and the outlet being dimensioned such that fuel in the fuel chamber is maintained at a predetermined level at normal fuel flow to the buffer fuel tank, and a fuel level switch for detecting whether the fuel level in the fuel chamber is at said predetermined level and thus indicating normal or abnormal fuel flow to the buffer fuel tank to the controller;
the fuelling device comprises a low fuel level switch and a high fuel level switch inside the buffer fuel tank, wherein the fuelling device is adapted to start fuelling of the buffer fuel tank when the low fuel level switch indicates a low level of fuel in the buffer fuel tank, and keep on fuelling the buffer fuel tank as long as the high fuel level switch fails to indicate a high level of fuel in the buffer fuel tank;
the fuelling device has two low fuel level switches and two high fuel level switches inside the buffer fuel tank;
the fuelling device comprises a one-way fuel flow member, such as a spring-loaded check valve, preventing fuel from flowing from the buffer fuel tank to the main fuel tank;
it comprises a third railcar with a secondary fuel tank, wherein the fuelling device is adapted to transfer fuel from the main fuel tank via the secondary fuel tank to the buffer fuel tank;
the fuelling device is adapted to stop the transfer of fuel from the main fuel tank to the secondary fuel tank if the fuel level in the main fuel tank falls below a critical threshold;
a pressure relief member, such as a spring-loaded check valve, is connected in anti-parallel to the or each fuel supply pump such that the pumped fuel circulates in a closed loop between the pressure relief member and its corresponding fuel supply pump if the fuel pressure inside the fuel line network exceeds a predetermined threshold;
the first railcar has a single internal combustion engine as the first fuel consumers;

the second railcar has at least two internal combustion engines as the second fuel consumers.

BRIEF DESCRIPTION OF THE DRAWINGS

The invention will now be described in detail with reference to the drawings, wherein:

FIGS. 4 and 5 are views of the fuel tanks used in the rail vehicle of FIG. 1;

FIG. 6 is a graph showing the fuel level vs. time in the fuel tanks when performing the inventive method;

FIG. 9 is a perspective view of the additional fuel tank of the rail vehicle of FIG. 7.

DETAILED DESCRIPTION

First Embodiment

Figure 1:
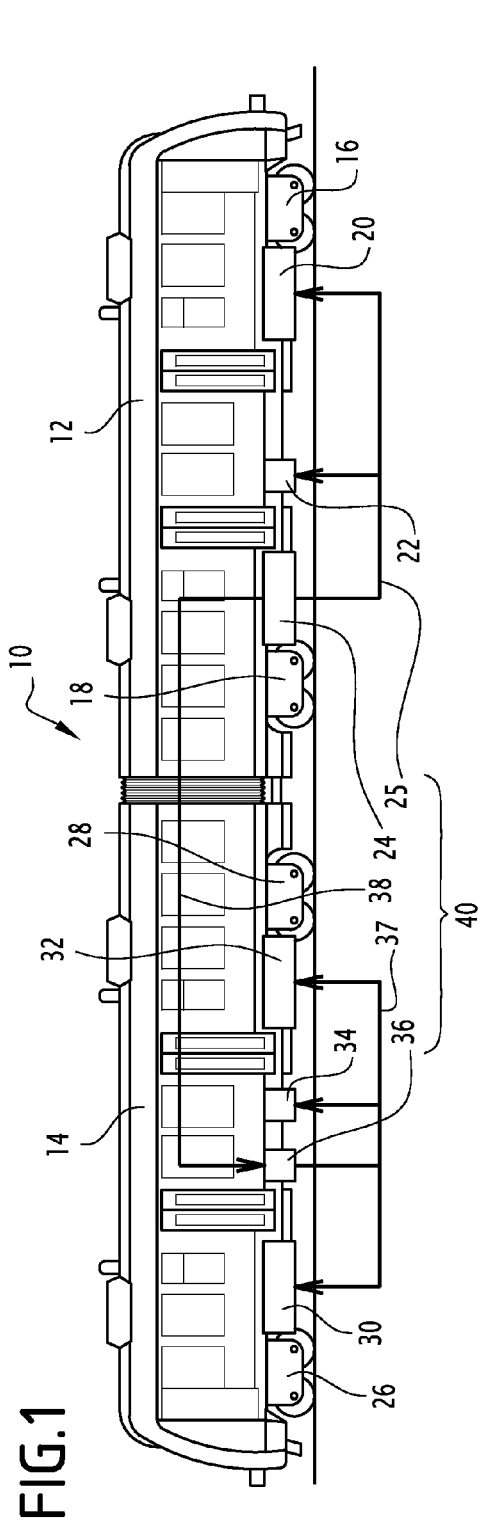
FIG. 1 shows a first embodiment of an inventive rail vehicle with two railcars.

With reference to FIG. 1, there is shown a rail vehicle 10, namely a motor train set or diesel multiple unit (DMU) with a first railcar 12 and a second railcar 14. Preferably, DMU 10 is a regional train intended to run on non-electrified railways. More precisely, FIG. 1 shows the DMU manufactured by the applicant under the trade name "Coradia Lint 54/3".

The first railcar 12 is fitted with one power bogie 16 and one running bogie 18. The power bogie 16 includes a driving unit 20 with a diesel engine known in the art as a "powerpack". In addition to the driving unit 20, the first railcar has a second fuel consumer, namely a heater 22. Powerpack 20 and heater 22 are supplied with fuel from a main fuel tank 24 located next to running bogie 18 via fuel conduits 25.

Second railcar 14 is fitted with two power bogies 26 and 28. Each power bogie 26, 28 includes a respective powerpack 30, 32. The second railcar 14 also has a heater 34. The fuel consumers 30, 32, 34 are supplied with fuel from a buffer fuel tank 36 located between the two power bogies 26, 28 via fuel conduits 37.

A fuelling device 38 connects the main fuel tank 24 to the buffer fuel tank 36. The fuelling device 38 runs from the first railcar 12 to the second railcar 14.

The fuelling device 38, the fuel tanks 24, 36 and the fuel conduits 25, 37 together form an on board fuel storage and supply system 40 of the DMU 10.

Figure 2:
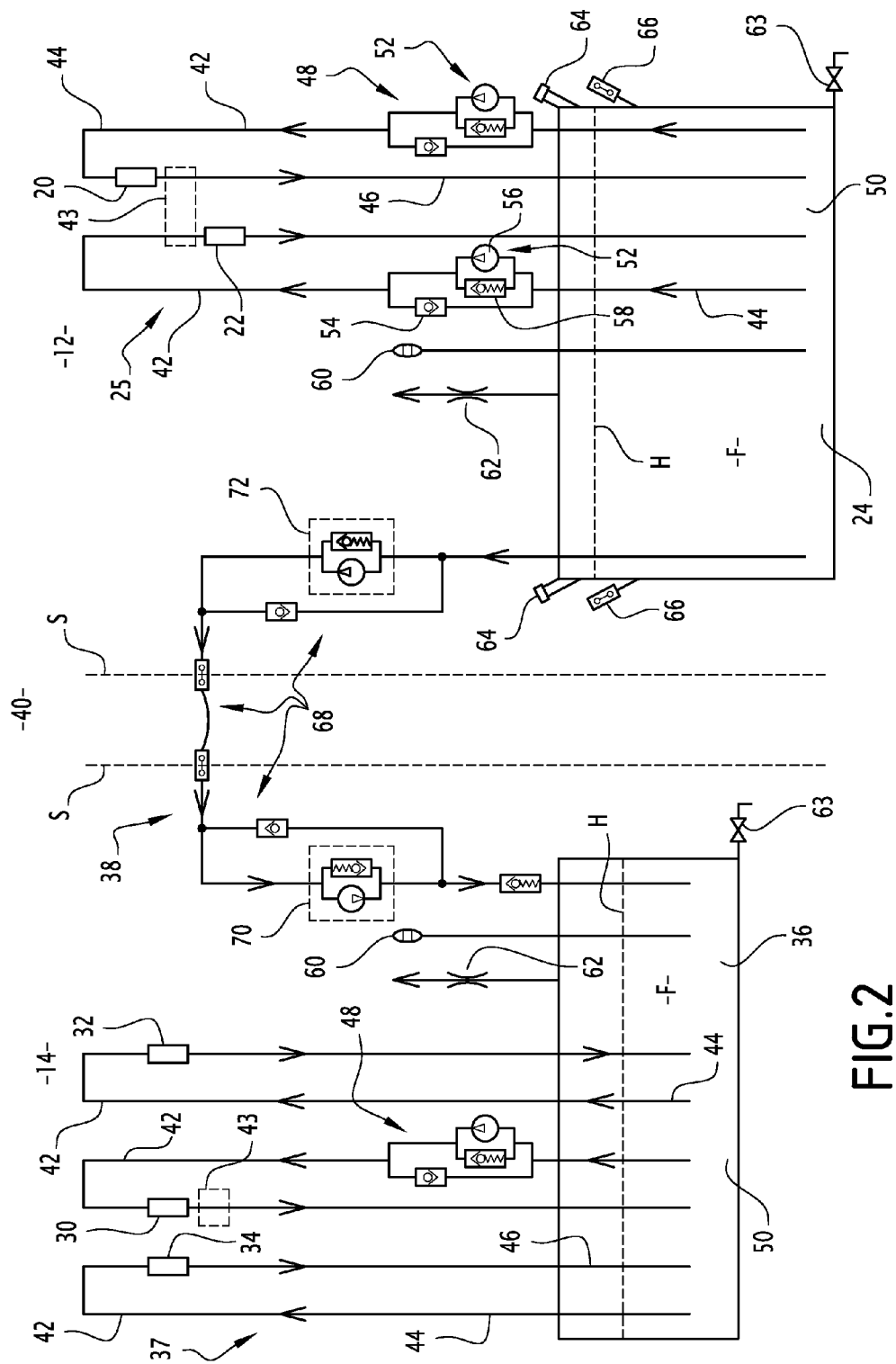
FIG. 2 illustrates the on board fuel storage and supply system of the rail vehicle of FIG. 1.

The on board fuel storage and supply system 40 is shown in greater detail in FIG. 2. The left hand side of FIG. 2 corresponds to the second railcar 14, and the right hand side corresponds to the first railcar 12. Vertical dotted lines S represent the boundary of each railcar 12, 14. The fuel level in each fuel tank 24, 36 is indicated by a horizontal line H and the fuel itself by the letter F.

Each fuel consumer 20, 22, 30, 32 and 34 is supplied with fuel via a corresponding fuel supply device 42. A heat exchanger 43 may be provided between two adjacent fuel supply devices 42. Since each fuel supply device 42 is identical (apart from the simplified fuel supply devices of powerpack 32 and heater 34 that have no fuel pump), only one of them will be described.

Fuel supply device 42 includes a fuel intake 44, a fuel return line 46 and a fuel pump assembly 48. Fuel intake 44 extends from the bottom 50 of the respective fuel tank to the respective fuel consumer. Fuel return line 46 extends from the fuel consumer to the bottom 50 of the respective fuel tank. The fuel pump assembly 48 is located in the fuel intake 44. Each fuel pump assembly 48 comprises a fuel pump unit 52 and a check valve 54 connected in parallel. The fuel pump unit 52 includes a fuel conveying pump 56 and a spring-loaded check valve 58 connected in anti-parallel.

Each fuel tank 24, 36 is fitted with a fuel level indicator 60, an air vent (such as a throttle valve) 62, and a gate valve 63. The main fuel tank 24 also has two fuel filler necks 64, one for each lateral side of the DMU 10, and, in some implementations, two dry couplings 66. The buffer fuel tank 36 lacks any fuel filler necks.

Figure 3:
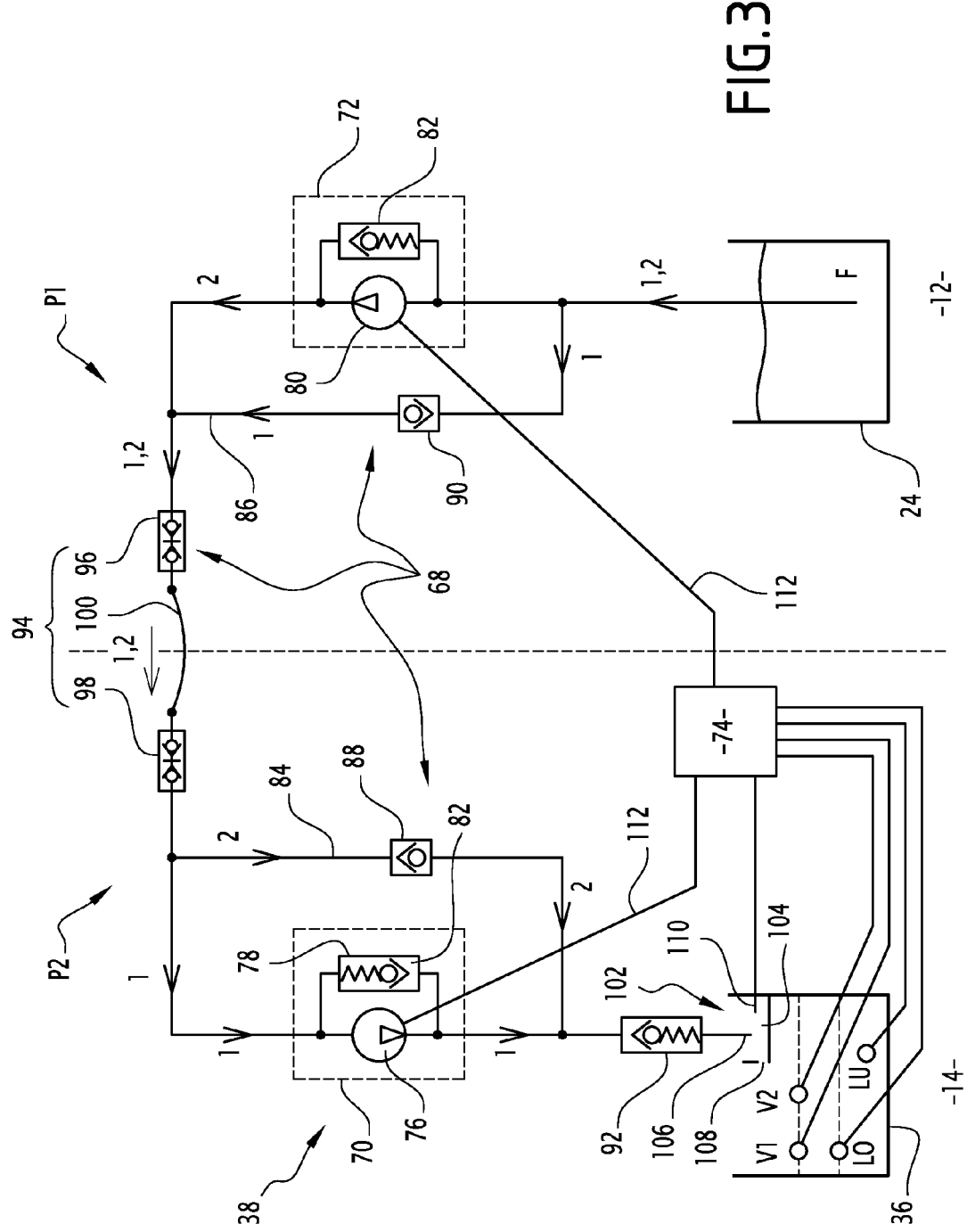
FIG. 3 shows the fuelling device of the system of FIG. 2.

The fuelling device 38 is shown in detail in FIG. 3. It comprises a fuel line network 68 for conveying fuel from the main fuel tank 24 to the buffer fuel tank 36, a main fuel supply pump unit 70 located in the fuel line network 68 and installed in the second railcar 14, an auxiliary fuel supply pump unit 72 located in the fuel line network 68 and installed in the first railcar 12, and a controller 74 for controlling the main fuel supply pump unit 70 and the auxiliary fuel supply pump unit 72.

The main fuel supply pump unit 70 comprises a main fuel supply pump 76 and a pressure relief member 78, such as a spring-loaded check valve, connected in anti-parallel.

The auxiliary fuel supply pump unit 72 comprises an auxiliary fuel supply pump 80 and a pressure relief member 82, such as a spring-loaded check valve, connected in anti-parallel.

The fuel line network 68 includes a fuel supply pump bypass 84, 86 preferably with a check valve 88, 90 for each fuel supply pump 76, 80. The bypass check valve 88, 90 is connected in parallel to its respective fuel supply pump unit 70, 72.

A one-way fuel flow member 92, such as a spring-loaded check valve, is arranged between the main fuel supply pump unit 70 and the buffer fuel tank 36.

The fuel line network 68 extends over the two railcars 12 and 14, with a first part P1 of the network being installed in first railcar 12, and a second part P2 of the network being installed in second railcar 14. A fuel connection assembly 94 connects the two parts P1 and P2. The fuel connection assembly 94 comprises a first fuel coupling 96, such as a dry break coupling, fitted onto the first railcar 12, a second fuel coupling 98, such as a dry break coupling, fitted onto the second railcar 14, and a fuel hose 100 extending between the two fuel couplings 96, 98.

The fuelling device 38 also comprises a fuel flow sensor 102 between the one-way fuel flow member 92 and the buffer fuel tank 36. This fuel flow sensor 102 comprises a fuel chamber 104 with a fuel inlet 106 and a fuel outlet 108, and a fuel level switch 110.

Furthermore, the fuelling device 38 includes two low fuel level switches LO and LU and two high fuel level switches V1 and V2 inside the buffer fuel tank 36.

Controller 74 has a signal connection 112 to the main fuel supply pump 76, the auxiliary fuel supply pump 80, and the fuel level switches 110, LO, LU, V1 and V2.

FIG. 4 is a perspective view of buffer fuel tank 36. Buffer fuel tank 36 has a generally cuboid shape. Its preferred volume is of the order of 0.08 Cbm. The fuel chamber 104 of fuel flow sensor 102 is attached to one side wall of buffer fuel tank 36. The three fuel intakes 44 and three fuel return lines 46 for the three fuel consumers of second railcar 14 are all arranged on the same side of buffer fuel tank 36.

FIG. 5 is a top plan view of main fuel tank 24. Main fuel tank 24 has a generally cuboid shape. Its preferred volume is of the order of 2.7 Cbm. The fuel line network 68 as well as the fuel intakes 44 and fuel return lines 46 are all arranged on the main fuel tank's top side. The auxiliary fuel supply pump unit 72 is fixed to a side wall of main fuel tank 24.

The normal operation, also called normal fuelling mode (NM), of the inventive on board fuel storage and supply system 40 will now be described.

Normal Operation

The process starts when the DMU 10 is refuelled at a filling station. Depending on which side the filling station is located with respect to DMU 10, the main fuel tank 24 is filled to a desired fuel level via one of the two fuel filler necks 64. It is to be noted that buffer fuel tank 36 remains empty at this stage since it is supplied with fuel from the main fuel tank 24 as will be explained later on. Accordingly, refuelling of DMU 10 at a filling station is quick and simple since one only has to fill a single fuel tank. This is in contrast to prior art DMUs where the fuel tank of each railcar needs to be filled individually and thus the DMU has to move along the filling station in several steps as the different fuel tanks are filled.

Once the refuelling of the DMU 10 is finished, it can then go into service. Once the DMU operates, the low fuel level switch LO indicates a low level of fuel in the buffer fuel tank 36 to controller 74. As a consequence, controller 74 switches fuelling device 38 into a normal fuelling mode. In this mode, main fuel supply pump 76 is activated and sucks fuel out of main fuel tank 24 into buffer fuel tank 36. The corresponding path followed by the fuel is indicated by arrows 1 in FIG. 3. The fuel F leaves the main fuel tank 24, bypasses the idle auxiliary fuel supply pump 80 via the corresponding bypass 86, crosses into the second railcar 14 via the fuel connection assembly 94, runs through the main fuel supply pump 76 and into the buffer fuel tank 36 via the fuel flow sensor 102.

The fuelling of the buffer fuel tank 36 is carried on until the high fuel level switch V1 or V2 indicates a high level of fuel in the buffer fuel tank 36 to the controller 74, whereupon the controller 74 deactivates the main fuel supply pump 76 and the fuelling device 38 goes into an idle mode.

After this initial filling process, buffer fuel tank 36 is regularly refilled once the fuel inside it has been depleted. To this end, controller 74 restarts the normal fuelling mode as soon as the low fuel level switch LO detects a low fuel level inside buffer fuel tank 36.

The inventive on board fuel storage and supply system 40 has several fail-safe features, which will now be described.

Fail-Safe Fuelling Mode

Let us suppose that the fuelling device 38 has some kind of malfunction, which means that there is not enough fuel reaching the buffer fuel tank 36. Such a malfunction could for example be due to cold ambient conditions, such as a temperature below −15° C. Under such conditions, the diesel fuel's viscosity increases rapidly and the main fuel supply pump may no longer be able to suck the fuel from the main fuel tank 24. Another malfunction could be leakage of fuel from the fuel line network 68.

When such a malfunction occurs, the fuel flow sensor 102 will fail to detect sufficient fuel flow to the buffer fuel tank 36 during normal fuelling mode. More precisely, the fuel level inside the fuel chamber 104 will drop and the fuel level switch 110 will signal a lack of fuel to the controller 74. As a consequence, the controller 74 will switch fuelling device 38 into a fail-safe fuelling mode.

In the fail-safe fuelling mode, the main fuel supply pump 76 is turned off. Instead, the auxiliary fuel supply pump 80 is activated and attempts to push fuel from the main fuel tank 24 to the buffer fuel tank 36 while bypassing the idle main fuel supply pump 76 via the corresponding bypass 84. The fuel flow path in the fail-safe fuelling mode is indicated by arrows 2 in FIG. 3. Thanks to its position at the beginning of the fuelling device 38, the auxiliary fuel supply pump 80 generates high pressure inside the fuel line network 68. In particular, auxiliary fuel supply pump 80 can push harder than the main fuel supply pump 76 can suck, since the depression generated by the latter cannot go beyond vacuum.

After the fuelling device 38 has run in fail-safe fuelling mode during a predetermined amount of time, the controller then checks whether the fuel flow sensor 102 now indicates sufficient fuel flow. If it does, the controller 74 issues a warning to the rail vehicle driver indicating a fuel viscosity problem. If does not, the controller 74 issues a warning to the rail vehicle driver indicating a fuel leakage and the risk of engine outage.

Excess Pressure Protection

The spring-loaded check valves 82 (cf. FIG. 3) act as an excess pressure protection. If the fuel pressure inside the fuel line network 68 exceeds a predetermined threshold, check valve 82 opens. Accordingly, pumped fuel circulates in a closed loop between the check valve 82 and the corresponding fuel supply pump 80, 76 until the fuel pressure inside the fuel line network 68 drops back below the predetermined threshold.

Backflow Prevention

The spring-loaded check valve 92 prevents fuel from flowing back from the buffer fuel tank 36 to the main fuel tank 24. Furthermore, thanks to the spring, a minimum pressure is required to open check valve 92 in the downstream direction. Hence, unintentional fuel flow to the buffer fuel tank 36 is also prevented. This is particularly useful when the rail vehicle 10 stops on a slope. Without check valve 92, the gradient would lead to uncontrolled fuel flow from one fuel tank to the other.

Fuel Level Switch Redundancy

Two low fuel level switches LO and LU and two high fuel level switches V1 and V2 are arranged inside the buffer fuel tank 36. Thus, if one low fuel level switch and/or one high fuel level switch breaks down, the fuelling device 38 can still operate with the remaining fuel level switches.

Fuel Level Switch Defect Detection

The sequence of switching of the fuel level switches LO, LU, V1, V2 is normally always the same. If there is a difference from the expected switching sequence an algorithm, preferably implemented in the vehicle's Train Control Monitoring System (TCMS), recognises a fuel level switch defect and gives a feedback to the driver.

Second Embodiment

Figure 7:
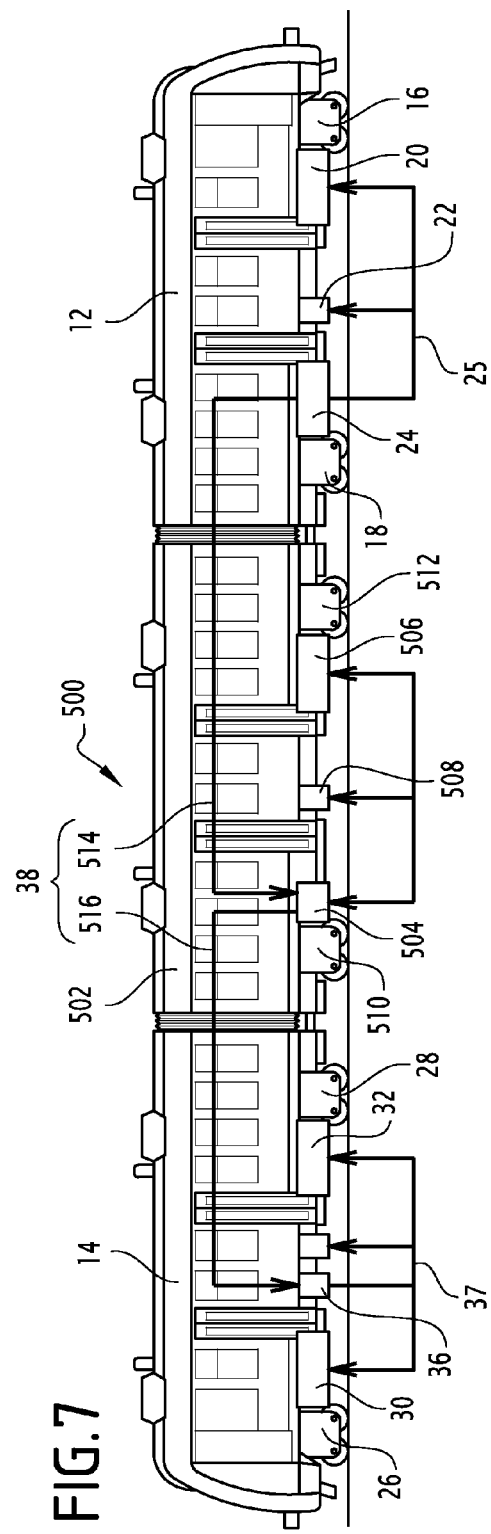
FIG. 7 shows a second embodiment of an inventive rail vehicle with three railcars.

With reference to FIG. 7, there is shown a rail vehicle 500, namely a motor train set or diesel multiple unit (DMU) with a first railcar 12, a second railcar 14, and a third railcar 502. Preferably, DMU 500 is a regional train intended to run on non-electrified railways. More precisely, FIG. 7 shows the DMU manufactured by the applicant under the trade name "Coradia Lint 81/4".

DMU 500 is essentially a stretched version of DMU 10, a third railcar 502 having been inserted between the first and second railcars 12, 14. In the following, only the differences with respect to DMU 10 will be described. For similar elements, reference is made to the description above in relation to DMU 10.

Third railcar 502 includes a secondary fuel tank 504 (preferred volume of around 0.9 Cbm) and two associated fuel consumers, namely a powerpack 506 and a heater 508. Third railcar 502 has two bogies, one running bogie 510, and one power bogie 512 powered by powerpack 506. The secondary fuel tank 504 is illustrated in FIG. 9. It has a generally cuboid shape and includes an air vent 62, two fuel filler necks 64, a fuel level indicator 60, as well as said fuel level switches V1 and V2.

Figure 8:
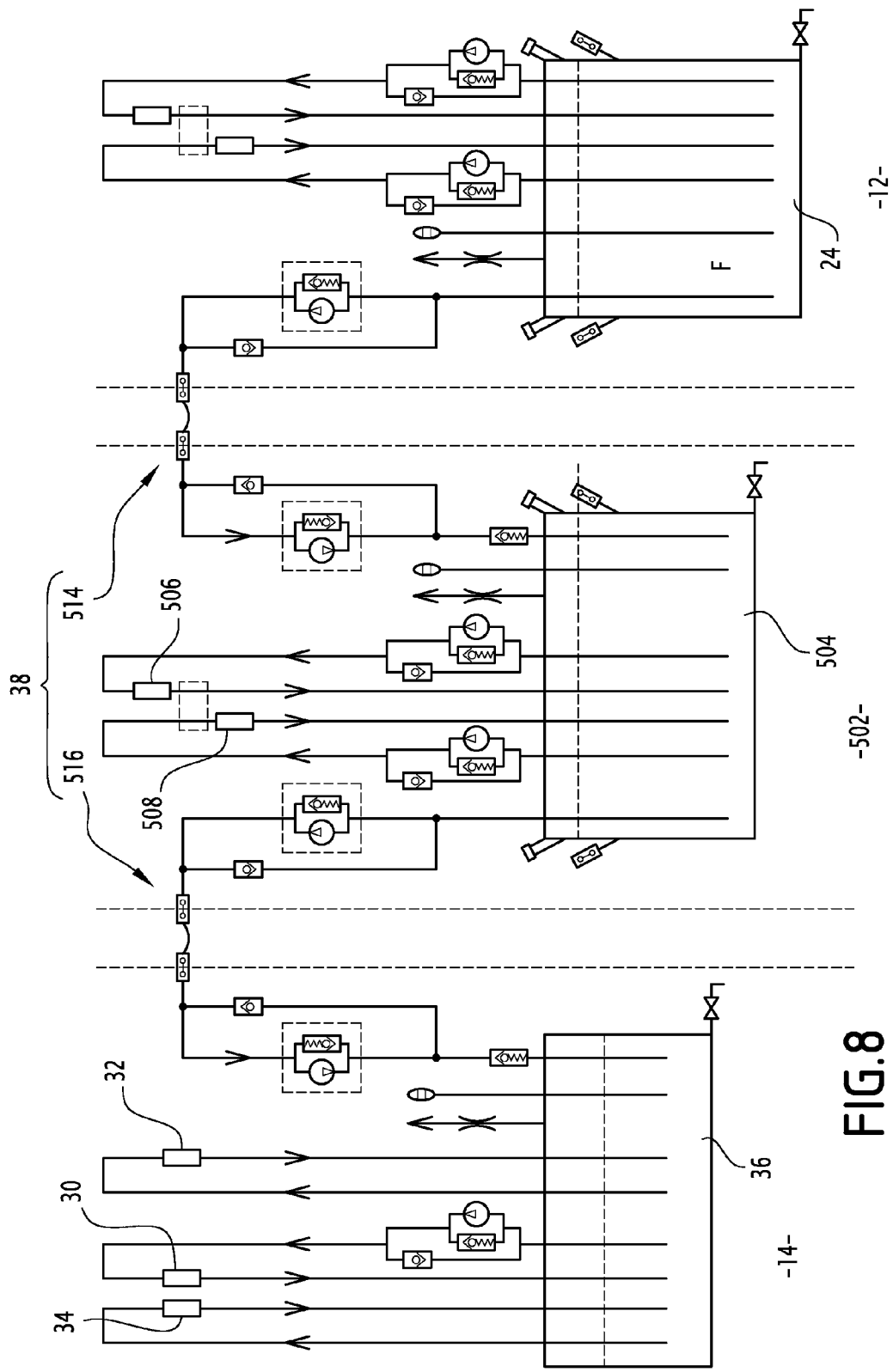
FIG. 8 illustrates the on board fuel storage and supply system of the rail vehicle of FIG. 7.

Fuelling device 38 comprises a secondary fuelling device 514 for fuelling the secondary fuel tank 504, and a buffer fuelling device 516 for fuelling buffer fuel tank 36. The details of fuelling device 38 are shown in FIG. 8. It will be apparent that secondary fuelling device 514 and buffer fuelling device 516 are both identical to the fuelling device 38 of FIG. 3 and work in the same way. During normal fuelling mode, both the buffer fuel tank 36 and the secondary fuel tank 504 are kept at a desired fuel level by taking fuel from the main fuel tank 24.

Fuel Shortage Mode

In contrast to DMU 10, DMU 500 features a fuel shortage mode SM. Fuelling device 38 switches into fuel shortage mode if the fuel level in the main fuel tank 24 falls below a critical threshold. In this mode, the transfer of fuel between the three fuel tanks 24, 36, 504 is stopped in such a way that all three fuel tanks 24, 36, 504 run dry essentially simultaneously. This increases the remaining time/distance that rail vehicle 500 can travel before the fuel runs out completely.

This fuel shortage mode SM is illustrated by FIG. 6. The graph in FIG. 6 plots the percentage fuel level $V_M$, $V_B$, $V_S$ of main fuel tank 24, buffer fuel tank 36, and secondary fuel tank 504 as a function of time t1. Here, at time t0, all three fuel tanks 24, 36 and 504 start at a fuel level of 100%. Up to time t1, fuelling device 38 runs in normal fuelling mode NM. At time t1, fuel level $V_M$ in main fuel tank 24 drops to a critical lower threshold $V_{Crit}$. This is when secondary fuelling device 514 switches to fuel shortage mode SM. This means that no more fuel is supplied to secondary fuel tank 504. As a result, fuel level $V_S$ in secondary fuel tank 504 starts to drop until it reaches the critical lower threshold $V_{Crit}$ at time t2.

It will be noted that only main fuel tank 24 needs to be refuelled if DMU 500 reaches the filling station before the start of the fuel shortage mode. Indeed, in this case, secondary fuel tank 504 and buffer fuel tank 36 are still full. If DMU 500 reaches the filling station after the fuel shortage mode has started, both the main fuel tank 24 and the secondary fuel tank 504 need to be refuelled via the fuel filler necks 64.

What is claimed is:

1. A rail vehicle comprising:
 a first railcar having a first passenger compartment for passenger transport;
 a second railcar having a second passenger compartment for passenger transport; and
 an on board diesel fuel storage and supply system,
 the first railcar having first diesel fuel consumers and a main diesel fuel tank providing diesel fuel to the first diesel fuel consumers, the main diesel fuel tank being arranged underneath the first passenger compartment;
 the second railcar having second diesel fuel consumers and a buffer diesel fuel tank providing diesel fuel to the second diesel fuel consumers, the buffer diesel fuel tank being arranged underneath the second passenger compartment;
 the on board diesel fuel storage and supply system having a fuelling device for transferring diesel fuel from the main diesel fuel tank to the buffer diesel fuel tank, the fuelling device comprising:
  a diesel fuel line network configured for conveying diesel fuel from the main diesel fuel tank to the buffer diesel fuel tank; and
  a main diesel fuel supply pump located in the diesel fuel line network for installation in the second railcar and configured for sucking diesel fuel from the main diesel fuel tank to the buffer diesel fuel tank.

2. The rail vehicle as recited in claim 1 wherein the fuelling device further comprises an auxiliary diesel fuel supply pump located in the diesel fuel line network for installation in the first railcar and for pushing diesel fuel from the main diesel fuel tank to the buffer diesel fuel tank.

3. The rail vehicle as recited in claim 1 wherein the diesel fuel line network further comprises a diesel fuel supply pump bypass for the diesel fuel supply pump.

4. The rail vehicle as recited in claim 3 wherein the bypass has a check valve.

5. The rail vehicle as recited in claim 1 wherein the fuelling device further comprises a controller for controlling the main diesel fuel supply pump and an auxiliary diesel fuel supply pump located in the diesel fuel line network for installation in the first railcar, wherein the controller is adapted to switch the fuelling device between:
 a normal fuelling mode, wherein the main diesel fuel supply pump supplies diesel fuel to the buffer diesel fuel tank while bypassing the idle auxiliary diesel fuel supply pump via a corresponding bypass, and
 a fail-safe fuelling mode, wherein the auxiliary diesel fuel supply pump supplies diesel fuel to the buffer diesel fuel tank while bypassing the idle main diesel fuel supply pump via a corresponding bypass.

6. The rail vehicle as recited in claim 5 wherein the fuelling device further comprises a diesel fuel flow sensor in the diesel fuel line network upstream of the buffer diesel fuel tank for detecting diesel fuel flow to the buffer diesel fuel tank, the diesel fuel flow sensor being connected to the controller, wherein the controller is adapted to switch the fuelling device from the normal diesel fuelling mode to the fail-safe diesel fuelling mode if the diesel fuel flow sensor fails to detect diesel fuel flow to the buffer diesel fuel tank.

7. The rail vehicle as recited in claim 6 wherein the diesel fuel flow sensor comprises:
 a diesel fuel chamber with a diesel fuel inlet and a diesel fuel outlet, the inlet and the outlet being dimensioned such that diesel fuel in the diesel fuel chamber is maintained at a predetermined level at normal diesel fuel flow to the buffer diesel fuel tank; and
 a diesel fuel level switch for detecting whether the diesel fuel level in the diesel fuel chamber is at said predetermined level and thus indicating normal or abnormal diesel fuel flow to the buffer diesel fuel tank to the controller.

8. The rail vehicle as recited in claim 1 wherein the diesel fuel ling device comprises a low diesel fuel level switch and a high diesel fuel level switch inside the buffer diesel fuel tank, wherein the fuelling device is adapted to:
 start diesel fuelling of the buffer diesel fuel tank when the low diesel fuel level switch indicates a low level of diesel fuel in the buffer diesel fuel tank, and keep on diesel fuelling the buffer diesel fuel tank as long as the high diesel fuel level switch fails to indicate a high level of diesel fuel in the buffer diesel fuel tank.

9. The rail vehicle as recited in claim 8 the fuelling device has a second low diesel fuel level switch and a second high diesel fuel level switch inside the buffer diesel fuel tank.

10. The rail vehicle as recited in claim 1 wherein the fuelling device comprises a one-way diesel fuel flow member preventing diesel fuel from flowing from the buffer diesel fuel tank to the main diesel fuel tank.

11. The rail vehicle as recited in claim 10 wherein the one-way diesel fuel flow member is a spring-loaded check valve.

12. The rail vehicle as recited in claim 1 further comprising a third railcar with a secondary diesel fuel tank, wherein the fuelling device is adapted to transfer diesel fuel from the main diesel fuel tank via the secondary diesel fuel tank to the buffer diesel fuel tank.

13. The rail vehicle as recited in claim 12 wherein the fuelling device is adapted to stop the transfer of diesel fuel from the main diesel fuel tank to the secondary diesel fuel tank if the diesel fuel level in the main diesel fuel tank falls below a critical threshold.

14. The rail vehicle as recited in claim 1 wherein a pressure relief member is connected in anti-parallel to the diesel fuel supply pump such that the pumped diesel fuel circulates in a closed loop between the pressure relief member and the corresponding diesel fuel supply pump if the diesel fuel pressure inside the diesel fuel line network exceeds a predetermined threshold.

15. The rail vehicle as recited in claim 14 wherein the pressure relief member is a spring-loaded check valve.

16. The rail vehicle as recited in claim 1 wherein:
the first railcar has a single internal combustion engine as the first diesel fuel consumers; and
the second railcar has at least two further internal combustion engines as the second diesel fuel consumers.

17. A method for storing and supplying diesel fuel in a rail vehicle wherein the rail vehicle includes a first railcar with first diesel fuel consumers and a main diesel fuel tank providing diesel fuel to the first diesel fuel consumers, and a second railcar with second diesel fuel consumers and a buffer diesel fuel tank providing diesel fuel to said second diesel fuel consumers, the method comprising the steps of:
diesel fuelling the main diesel fuel tank to a desired main level;
operating the rail vehicle;
during operation of the rail vehicle, diesel fuelling the buffer diesel fuel tank to a desired buffer level and maintaining a diesel fuel level of the buffer diesel fuel tank at the desired buffer level by transferring diesel fuel from the main diesel fuel tank to the buffer diesel fuel tank by a fuelling device, the fuelling device including a diesel fuel line network conveying diesel fuel from the main diesel fuel tank to the buffer diesel fuel tank, the fuelling device including a main diesel fuel supply pump located in the diesel fuel line network for installation in the second railcar, the main diesel fuel supply pump sucking diesel fuel from the main diesel fuel tank to the buffer diesel fuel tank to transfer the diesel fuel from the main diesel fuel tank to the buffer diesel fuel tank, the first railcar having a first passenger compartment for passenger transport, the second railcar having a second passenger compartment for passenger transport, the main diesel fuel tank being arranged underneath the first passenger compartment, the buffer diesel fuel tank being arranged underneath the second passenger compartment.

\* \* \* \* \*

UNITED STATES PATENT AND TRADEMARK OFFICE
CERTIFICATE OF CORRECTION

| | | |
|---|---|---|
| PATENT NO. | : 9,580,083 B2 | Page 1 of 1 |
| APPLICATION NO. | : 14/212406 | |
| DATED | : February 28, 2017 | |
| INVENTOR(S) | : Konrad Steindorff et al. | |

It is certified that error appears in the above-identified patent and that said Letters Patent is hereby corrected as shown below:

On the Title Page

Item (72) should read:
(72) Konrad Steindorff, Braunschweig (DE), Klaus Scheller, Vechelde, (DE)

Signed and Sealed this
Sixth Day of June, 2017

Michelle K. Lee
*Director of the United States Patent and Trademark Office*